United States Patent [19]
Tonomura et al.

[11] Patent Number: 5,576,950
[45] Date of Patent: Nov. 19, 1996

[54] VIDEO IMAGE SEARCH METHOD AND SYSTEM USING THE SAME

[75] Inventors: Yoshinobu Tonomura; Akihito Akutsu; Yukinobu Taniguchi, all of Yokohama; Gen Suzuki, Fujisawa; Tomio Kishimoto, Yokohama, all of Japan

[73] Assignee: Nippon Telegraph and Telephone Corporation, Tokyo, Japan

[21] Appl. No.: 280,507

[22] Filed: Jul. 26, 1994

[30] Foreign Application Priority Data

Jul. 28, 1993 [JP] Japan ................................. 5-185753
Jun. 8, 1994 [JP] Japan ................................. 6-125924

[51] Int. Cl.$^6$ ................................................ G11B 27/028
[52] U.S. Cl. ..................... 364/514 A; 386/95; 386/121
[58] Field of Search ..................... 364/514 A; 358/311, 358/335, 300, 537; 360/11.1, 14.3; 348/222, 430

[56] References Cited

U.S. PATENT DOCUMENTS

| | | | |
|---|---|---|---|
| 3,740,463 | 6/1973 | Youngstrom et al. | 360/14.3 |
| 3,748,381 | 7/1973 | Strobele et al. | 360/11.1 |
| 4,760,458 | 7/1988 | Watanabe et al. | 358/537 |
| 5,027,221 | 6/1991 | Hisatake et al. | 358/300 |
| 5,140,435 | 8/1992 | Suzuki et al. | 358/335 |
| 5,179,449 | 6/1993 | Doi | 358/311 |

*Primary Examiner*—Emanuel T. Voeltz
*Assistant Examiner*—Thomas Peeso
*Attorney, Agent, or Firm*—Pollock, Vande Sande & Priddy

[57] ABSTRACT

A video signal, replay by a video player, is subjected to image processing by a calculation control part of a video image searching device to calculate the image quality value and another feature value. An image whose image quality satisfies a predetermined condition and whose feature value matches a predetermined condition is detected as an image in which an event has occurred. Such images are printed on an output paper together with associated addition information. A main control part of a video image access device reads out the additional information on the output paper by a scanner and effects control via a video control part to search the image corresponding to that information by a video player.

35 Claims, 12 Drawing Sheets

VIDEO IMAGE SEARCH METHOD AND SYSTEM USING THE SAME

BACKGROUND OF THE INVENTION

The present invention relates to a method and a system which automatically detect an image which meets a particular condition, through image processing, from a video signal stored on a recording medium or input from the outside video or, based on additional information output in relation to the detected image, search the recording medium for the image or related image and replay it as a video image on a display.

In the conventional procedure of getting the summary or gist of video images recorded on a video tape or the like, a video player is used to manually fast-forward for viewing the recorded video images, and when it is desired to automatically perform the procedure, a computer is used to display the contents of the video images in a compressed form on the computer screen as set forth in Japanese Pat. Laid-Open No. 237284/92. In the latter, a pixel-to-pixel intensity difference of two successive frames of video data, for example, is detected and the sum of absolute values of such differences throughout the noted or current frame is obtained as an inter-frame change; video frames of small inter-frame change are replayed at high speed and video frames of large inter-frame change at lower speed. This method implements what is called fast browsing which reduces the reproducing time for getting the gist of video images.

In a literature "Magnifier Tool for Video Data" (Michael Wills et al., proceedings of ACM CHI' 92, 00.93–98, May, 1992) there is proposed a method that displays, on a screen, images obtained by hierarchial sampling of video images at varying sampling rates. According to this method, frame images by coarse sampling are first displayed and for viewing in more detail, frame images between those by coarse sampling are displayed by finer sampling. In Japanese Pat. Laid Open Nos. 20367/93 and 172892/85 there are disclosed techniques which automatically extract one still frame from each scene and assemble such still frames to produce an index so as to permit easy retrieval of the contents of video data. With these techniques, a scene of a large inter-frame change is selected as a still-image. In another Japanese Pat. Laid-Open No. 20367/93 there is disclosed a technique concerning a video printer similarly intended for more efficient retrieval of a desired image. According to this technique, images of low inter-frame correlation are picked out and these images are reduced in size and printed out as a single frame. Moreover, U.S. Pat. No. 5099322 discloses a scene change detection system and its applications. According to this patent, a sudden change in the inter-frame difference of a video signal is detected and a scene change is applied to the automatic creation of video tape logs, fast-forward navigation of the video player such as mentioned previously and a moving object surveillance system.

Of the conventional techniques mentioned above, the method of providing a compressed display of the contents of video images on a display screen requires the computer screen for viewing the gist of the video images, and hence is subject to constraints of costs and the site for viewing.

With the method of fast-forward reproduction by a video player, too high a replaying speed does not allow the user to comprehend the contents of images, the user is forced to overwork his eyes and speed control must be done manually by the user. Hence, even if an ordinary person wants to get the gist of a sequence of video images taken by a commercially available video camera, he cannot readily take a glance at their contents; that is, it is necessary to fast-forward for getting the gist of the video signals and fast-forward or rewind for finding a particular scene. Because of such complexity involved, many people often give up viewing or reproduction of recorded video images.

With the conventional techniques disclosed for the search of video images, the search is made basically by detecting a scene change from a sequence of video images through utilization of an inter-frame change. While problems concerning fast retrieval of video data have been solved, such problems as mentioned below are still unsolved. That is, in the selection of indexes (or still-frame images), no particular attention is paid to the quality of the selected images. In the prior art, the scene in which a dramatic change occurs in the inter-frame change is assumed to indicate the start of a new scene and the leading image is regarded as a representation of that scene, but in practice, they are not appropriate for such purposes in many cases. Conventionally, the still frame (or the representative image) is selected without taking into account physical properties, such as out-of-focusness and blurring by camera motion or defocusing and overexposure or underexposure, and intended properties by camera work (In general, the image of a scene in which camera work is switched is commonly called a panning or zooming end and suggests videographer's intentions). When such inappropriate still-frame images are displayed as representative images on a screen or printed out, in particular, when they are printed out as a list of video images on paper, their poor quality is emphasized because of high-resolution image representation feature of paper.

Furthermore, in the case of printing out video data onto paper, the layout of indexes (representative still images) is not taken into account; this does not allow ease in the secondary use of printed paper which is used in a folded form as in the cases of an index card of a video tape, a pocketable loose-leaf filing system and so forth.

SUMMARY OF THE INVENTION

A first object of the present invention is to provide a video image retrieval method which permits retrieval of high quality images under preset event conditions and a device using such a method.

A second object of the present invention is to provide a retrieved video image printing method and device which prints out retrieved images by a printer to present the gist or summary of video images instead of using the computer screen or video monitor and hence are free from the viewing site constraint and capable of displaying high quality images.

A third object of the present invention is to provide a retrieved video data printing method and device with which it is possible to select and display appropriate representative images and lay them out in appropriate sizes.

A fourth object of the present invention is to provide a method and device which enables video images to be automatically accessed and replayed on the basis of information associated with them.

To attain the above objectives, according to a first aspect of the present invention, a video signal from a video signal source is subjected to image processing in a calculation control part on a frame-by-frame basis to obtain a quality measurement (or value) and at least one more feature value of the image as event items. When they satisfy predetermined event conditions, it is decided that the frame concerned involves an event and the images of that frame are arranged or stored in a predetermined layout in a predetermined storage area of a layout storage part, while at the same time at least one part of additional information related to the images is also stored in the storage area. Video images of such frames decided to involve events and the associated additional information are repeatedly stored in the storage area, after which they are read out therefrom for subsequent operation.

According to a second aspect of the present invention, the additional information output from the layout storage part according to the first aspect is read out or grabbed into a main control part, wherein it is converted to video player control information, which is used to control the video player to access images corresponding to the additional information.

The video image search method and device according to the present invention utilize the quality measurement or value of images in combination with another event item, and hence guarantee that images of the frame decided to involve an event are provided with high quality. Furthermore, the additional information corresponding to the video frame decided to involve an event is output and, at the user side, it is used to control the video replay monitor, by which the associated video images can automatically be accessed and replayed.

DESCRIPTION OF THE PREFERRED EMBODIMENTS

A detailed description will be given, with reference to the accompanying drawings, of an embodiment of the present invention.

Figure 1:
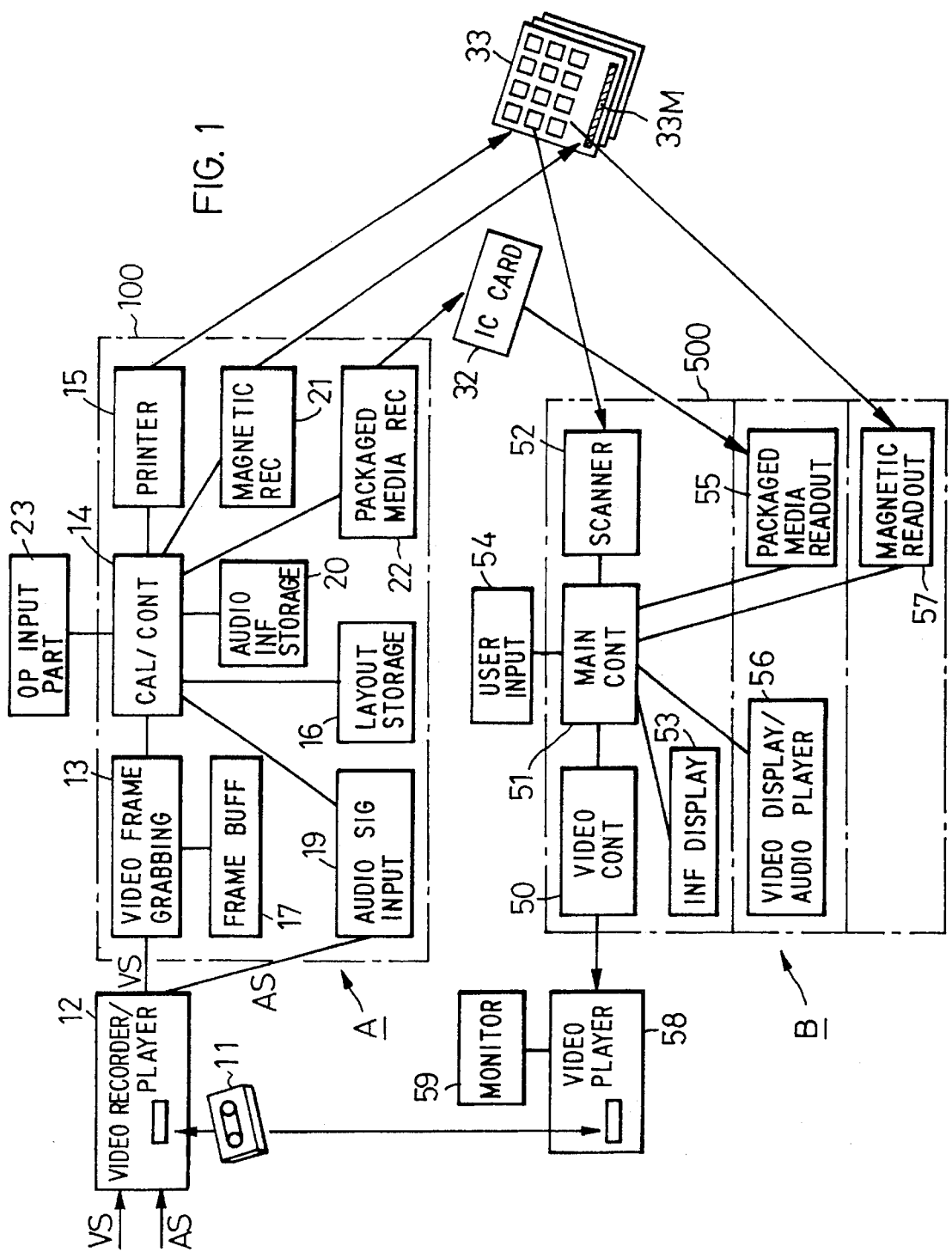
FIG. 1 is a block diagram of the image search system according to the present invention.

FIG. 1 illustrates, in block form, the system configuration of an embodiment of the present invention, including an image detecting system A and an image access system B for the user which cover the concepts of all claims appended hereto. In this example, the image detecting system A is shown to permit printing of detected images. Reference numeral 12 denotes a video recorder/player and 100 denotes a video image searching device. The image access system B comprises a video player 58 controllable from the outside, a monitor 59 for displaying images replayed by the video player 58, and a video image access device 500. The video image searching device 100 is made up of a video image grabbing part 13, a calculation control part 14, a printing part 15, a layout storage part 16, a frame buffer 17, an audio signal input part 19, an audio information storage part 20, a magnetic recording part 21, a package media recording part 22 and an operation input part 23. The video image access device 500 is made up of a video control part 50, a main control part 51, a scanner 52 for optically reading printed information, an information display part 53, a user input part 54, a package media readout part 55 for reading out data stored on an IC card or similar package media, video display/audio replaying part 56 and a magnetic readout part 57. Reference numeral 11 denotes a video tape, VS a video signal from the video recorder/player 12 at the image searching side, 33 an output form or sheet, 33M a magnetic coating and 32 an IC card.

In the image detecting system A, an input video signal (composed of a video signal and an audio signal) may be a video signal that is replayed from the video recorder player 12 or input from the outside. While in FIG. 1 an external video signal is shown to be input into the system via the video recorder/player 12, it may also be input directly into the system. In the case of the video signal that is input from the outside, it is also possible to detect an image that satisfies a desired condition by the video image detecting device 100 while at the same time recording the video signal by the video recorder/player 12. The external video signal may be a video signal which is obtained by receiving, with a receiver (not shown), a program broadcast by cable or radio, or a video signal that is produced by a video camera. The video recorder/player 12 may be one that uses, as a video signal recording medium, a magnetic tape, magnetooptic disc or optical disc (only for reproduction). The present invention will hereinafter be described in connection with the case of using the magnetic tape (a video tape).

The video recorder/player 12 replays the video tape 11 and, at the same time, supplies the video image searching device 100 with the video signal VS and the audio signal AS which constitute the video signal. In the video data searching device 100, the video signal VS is stored in the frame buffer 17 via the video image grabbing part 13 on a frame-by-frame basis and the audio signal AS is sampled by an audio signal input part 19 and then fed to the calculation control part 14. The calculation control part 14 reads out the frame image from the frame buffer 17 and analyzes it (image processing) while at the same time it reads out the audio data from the audio signal input part 19 and analyzes it (sound processing). When either one or both of the results of such image processing and sound processing satisfy a particular condition, the calculation control part 14 decides that the frame image involves an event and, in accordance with a predetermined size and a predetermined layout method, lays out the frame image in that area of the layout storage part 16 which correspond to a printing area of printing paper. Besides, additional information that is provided by the image analysis (the frame number, the image taking time, camera work parameters, sound, etc.) is expressed following predetermined formats and laid out, together with the detected frame image, in the layout storage part 16 in accordance with predetermined positional conditions. After completion of layout of respective frame images and the associated additional information, the calculation control part 14 controls the printer 15, by which the images and additional information in the layout storage part 16 are printed out onto the output paper 33. Incidentally, the additional information can be recorded in the magnetic coating 33M on the output paper 33 through control of the magnetic recording part 21 or on the IC card 32 through control of the package media recording part 22. The audio signal AS, when included in the additional information, remains recorded in the storage part 20 for a certain period of time after the frame image is decided to involve an event.

On the other hand, in the image access system B, when the additional information retrieved and printed by the video image searching device 100 onto the output paper 33 is optical information such as letters or bar codes, the main control part 51 controls the scanner 52 to read out the additional information and converts the read-out information to information for controlling the video player 58. The thus converted information is used to control the video player 58 via the video control part 50. When the additional information is recorded on the magnetic coating 33M, it is read out through control of the magnetic readout part 57; when the information is recorded on the IC card 32, it is read out through control of the package media readout part 55. The user input part 54 is provided for the user to input additional information readout instructions and instructions of operating the video player 58 into the main control part 51 by keying. The information display part 53 is to display the contents of the read-out additional information. The video display/audio replay part 56 is to display a video signal and replay an audio signal when they are contained in the additional information.

Figure 2:
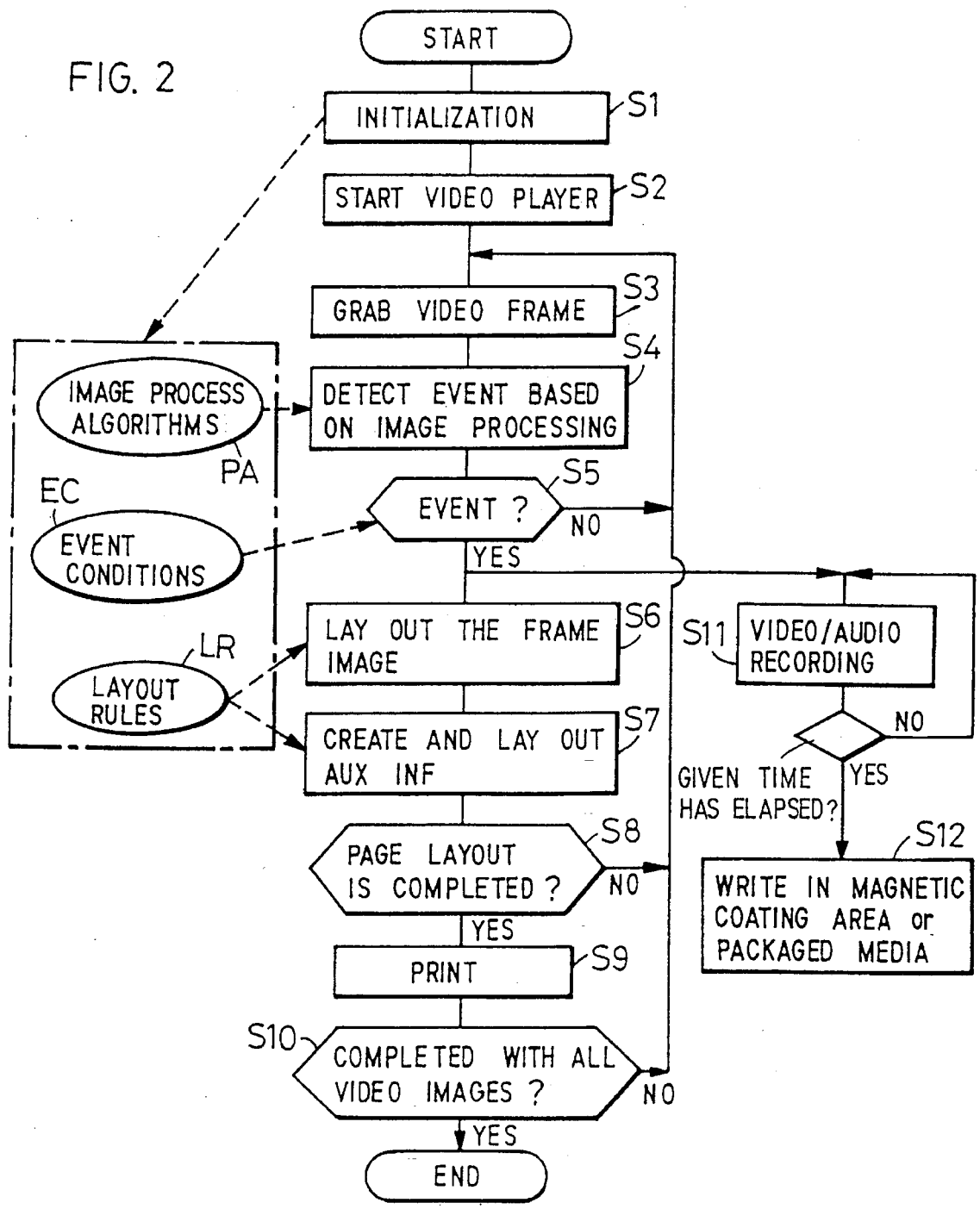
FIG. 2 is a flowchart showing the process by an image detecting system A in FIG. 1.
Figure 10:
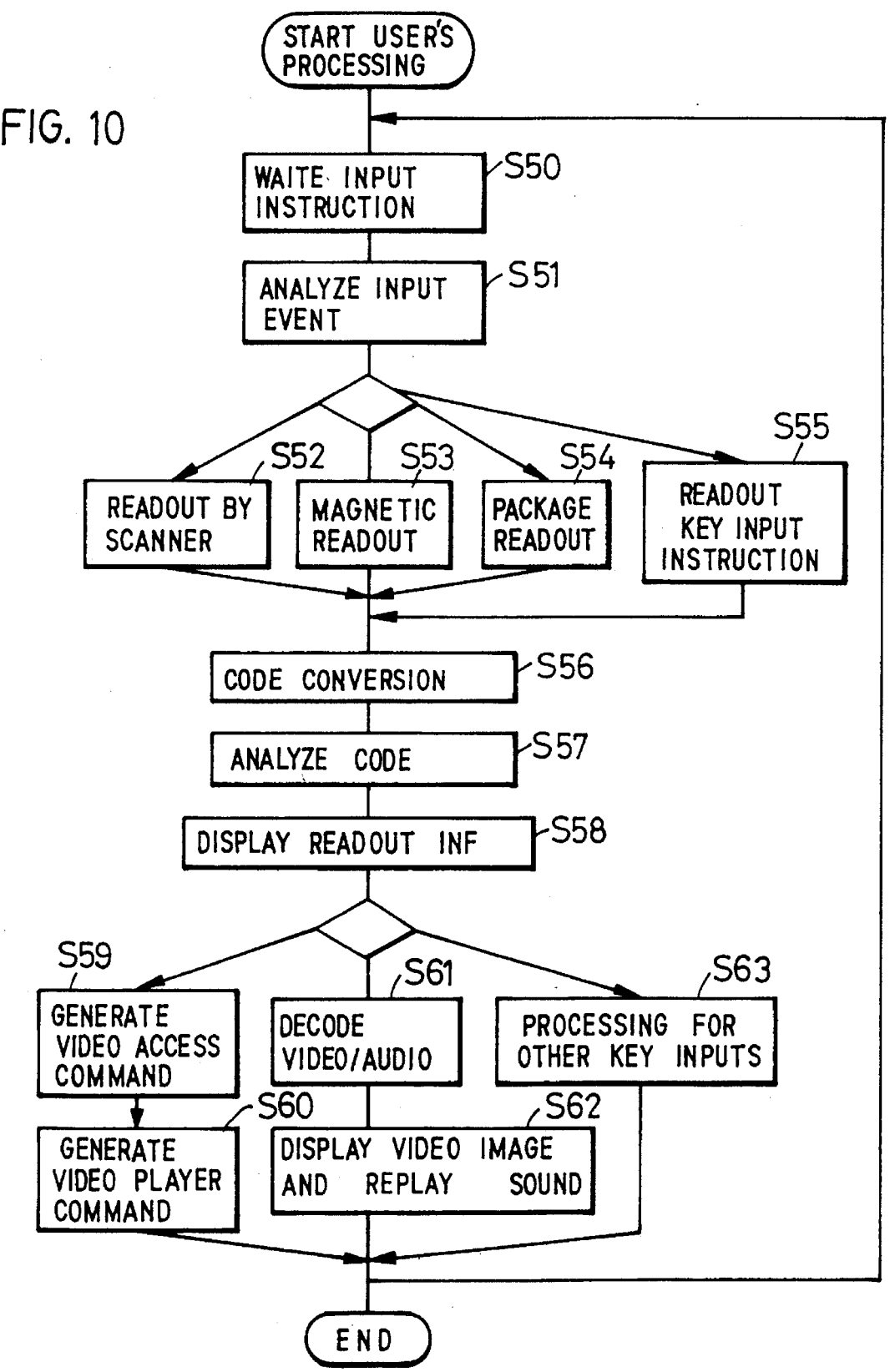
FIG. 10 is a flowchart showing the process by an image access system B in FIG. 1.
Figure 11:
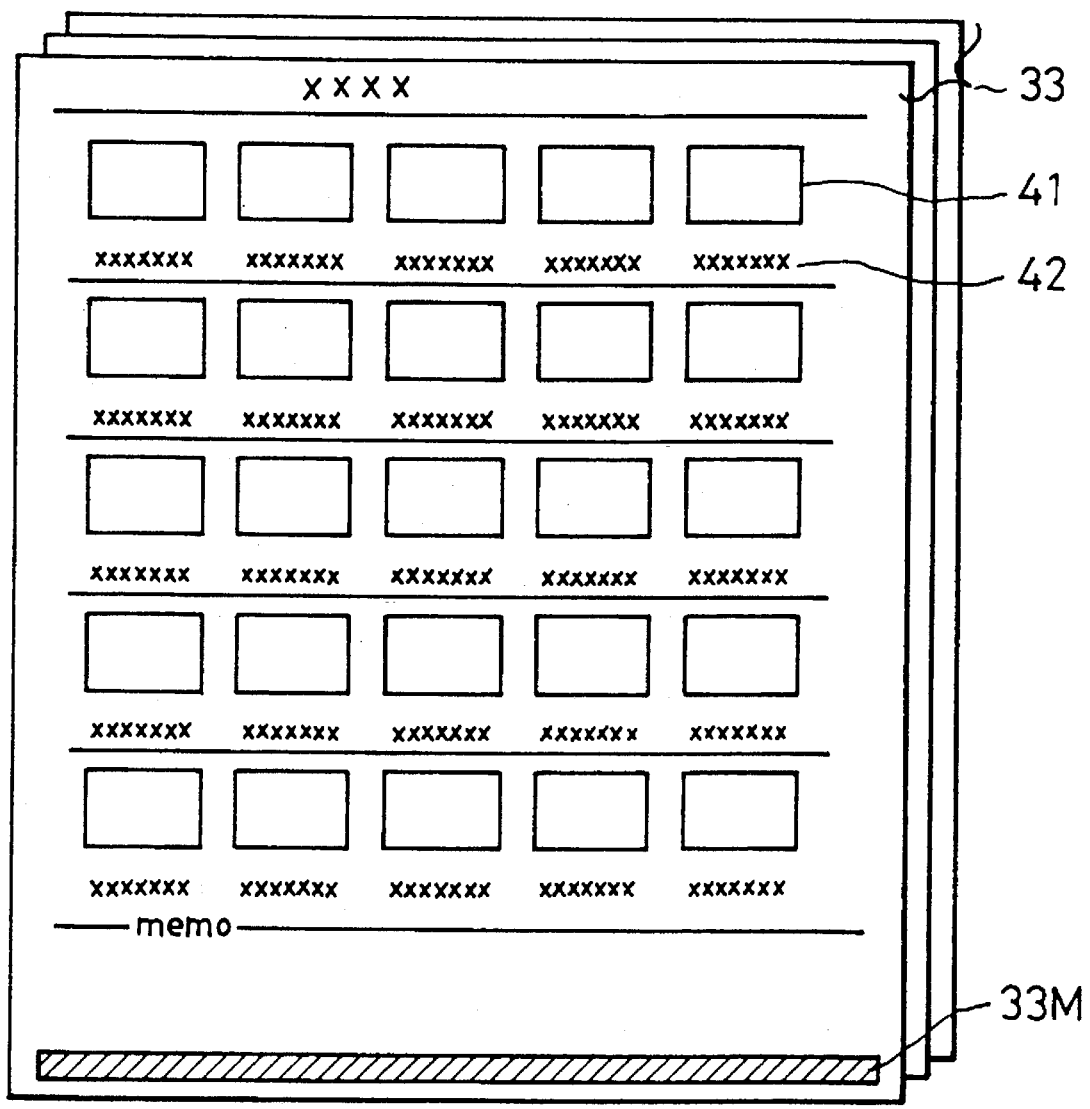
FIG. 11 is a diagram showing an example of an arrangement of video image overviews on an output sheet.

A description will be given of an embodiment of the video image searching method of the present invention which is implemented by such a system configuration as mentioned above. FIG. 2 is a flowchart showing the procedure for control by the calculation control part 14 of the image detecting system A in FIG. 1, FIG. 10 is a flowchart showing the procedure by the image access system B in FIG. 1 and FIG. 11 shows images of video overviews laid out on the output paper 11. Now, the embodiment of this invention method will hereinafter be described in the order of steps involved in processing.

Referring first to FIG. 2, the image detecting system A will be described.

At first, the video tape 11 with images recorded thereon is set or loaded in the video recorder/player 12. Then, an image detecting process is started. The calculation control part 14 first sets, in step S1, an image processing algorithm PA, an event condition C for detecting an event for the algorithm PA and a layout rule LR for laying out representative images and additional information. In this initialization, the user sets, through the operation input part 23, the contents of desired operations that he selects from a menu preset in the operation program of the device, for example. Next, the reproduction of the video tape 11 is started (step S2). In this instance, if the video recorder/player 12 is controllable from the outside, the tape is played back by the calculation control part 14; if not, it is performed manually. The video signal VS replayed from the video tape 11 is grabbed, as digital image data, by the video grabbing part 13 into the frame buffer 17 over a plurality of frames (step S3). When the event detection processing described later takes one frame period (1/30 sec, for instance) or more, the video frames are grabbed discontinuously. The audio signal AS similarly replayed from the video tape 11 is grabbed by the audio signal grabbing part 19 and digitized, thereafter being stored in the storage part 20.

The thus grabbed frame images are subjected to an event detection processing for a noted feature item of the video signal by the image processing algorithm initialized by the calculation control part 14 (step S4), thereby determining whether the video signal satisfies the initialized event condition C (step S5). In this case, it is effective in getting the gist of the video image to detect an image cutting point which can be said to be the most significant event in video images. An algorithm that can be used to detect such an image cutting point is disclosed in, for example, Japanese Pat. Laid-Open No. 37853/93 entitled "Method for Segmenting Moving Video Image at Cutting Points". According to that method, a pixel-to-pixel intensity difference between the current and immediately previous video frames is detected and the ratio of the number of pixels for which the intensity difference exceeds a threshold value to the total number of pixels of one frame is calculated; when the ratio exceeds a threshold value, it is decided that a cut has occurred between the current and immediately preceding video frames. It is also possible to employ a method in which a hue histogram (the ratio of predetermined areas of red, green and blue colors, for example, with respect to the area of the whole frame) is calculated and it is decided that an event has occurred when the histogram of the current frame greatly differs from the histogram of the preceding frame, or when a frame having a specific hue or a combination of hues is found. According to still another method, images of the current frame and one or more previous frames, spaced a plurality of frames apart, are compared in terms of a predetermined feature item, the difference in feature value between the images of the frames is calculated, and the cause of the change in the image (camera work, flash, etc.) is estimated from changes in the difference; when the image of the current frame is one that has abruptly changed by a quick motion of a large object or by flashing, such a frame is avoided, and when the image of the current frame is the result of desired camera work, it is extracted. Thus, various image processing algorithms and event conditions can be set according to particular purposes and applications.

Another event that can be used to get the gist of recorded video data is camera work. As an automatic camera work detection algorithm, it is possible to use, for example, an image shooting state detecting method disclosed in Japanese Pat. Laid-Open No. 98205/94. This is a method in which a temporal-spatial edge analysis of a temporal-spatial image formed by a plurality of frame images is carried out to track and analyze temporal changes in features derived from the entire motion of the image, thereby detecting camera work. When the camera work detected by this method meets a particular condition, it is determined that an event is present. The particular condition mentioned herein is, for example, a condition that (panning, tilting, zooming or similar camera work) was started or finished or some of such operations were simultaneously started or finished in the frame concerned. In this instance, the detected camera work parameter is fed to the layout storage part 16 to specify the layout of the captured image.

There are cases where the camera work for shooting each scene represents the videographer's intentions. That is, the image with which the camera work is completed is a good representation of what the videographer wants to express. A method of extracting a representative frame image through utilization of this feature is proposed in Japanese Pat. laid-Open No. 43539/92. The use of this method permits extraction of images which represent an expression of the videographer's intentions. The information on camera work is a quantity that can be used to make a decision of an event.

Now, other examples of the image processing algorithm, which is initialized in the calculation control part 14, will be described in connection with cases of using a matching value and a quality value as conditions for an event. Upon starting the printing process, video signals are replayed and a frame image first captured is stored as a reference image. Next, frame images that are sequentially captured in a time series are compared with the reference image and matching values are calculated. In this example, assume that a matching method is used and that the value computed in the course of matching is used as the reference value. Various methods, such as a template matching method, an image structure matching method and a method using relaxation, can be used for image matching. For example, in the case of using the template matching method, a difference or correlation value between the reference image and the subsequently captured image is the matching value; in the case of using the image structure matching method, a value that indicates a structural similarity (the distance in a feature space in the case of projecting thereinto structural feature which are contained in the image, such as a segment or edge) can be computed as the matching value.

In the case of using the quality measurement or value as the condition for an event, according to an aspect of the present invention, at least one quality value is used, as one event condition, in combination with at least one more event condition so as to detect a high quality image. To define the image quality, use is made of a measure that permits an objective evaluation of the image. Possible causes of poor image quality are "blurring" "insufficiency of dynamic ranges" of intensity and colors representing the image, and so forth. The defocus is caused by an image motion and defocusing of the camera. The widths of the dynamic ranges of the intensity and colors representing the image arise from the relationship between the object and illumination or lighting; for example, in the case of shooting against light, the background is bright and the object dark. The image qualities by the above factors can be expressed quantitatively as listed below.

A. Blurring (a) Blurring by image motion

The blurring by an image motion can be classified into blurring by a motion of the camera, blurring by a motion of the subject and blurring by a combination of them. When the motion of the image is large, the quantity of blurring is also large. That is, the quantity of blur can be expressed quantitatively by a quantitative representation of the magnitude of motion.

Camera shake or movement: This can be regarded as a specific motion of camera work. As camera work detecting methods, there have been reported a method of computing camera work on the basis of motion vectors, for example, Akutsu, Tonomura, et al., "Method of Defining Camera Work for Moving Picture Indexing", Transaction of the Institute of Electronics, Information and Communication Engineers of Japan, D-II, Vol. J75-D-II, No. 2, pp. 226–235 (1992) and a method for estimating camera work by analyzing spatio-temporal images, for example, Akutsu and Tonomura, "Studies of the Extraction of a Global Motion by Spatio-Temporal Images", 1992 Autumn National Conference of Institute of Electronics, Information and Communication Engineers of Japan, D-254. With these methods, it is possible to compute the quantity of camera shake from camera parameters or their abrupt periodic changes.

Object/motion: The quantity of defocus by a motion of the object can be calculated from the inter-frame difference of images or spatio-temporal projection images. The spatio-temporal projection image has been reported as a method to visualize a motion in images, for example, in Akutsu and Tonomura, "Analysis of Images by Projection Method and Application to Video Handling", Transactions of the Institute of Television Engineers of Japan, Technical Group on Artistic Imaging Technology, AIT94–10.

(b) Blurring by camera defocusing

This is considered to be caused by loose focusing of the camera. This quantity of blur can be defined by the amount of spatial frequency such as lines and boundaries of areas in images. A loose-focused image contains many frequencies in the low-frequency portion of the frequency region. This quantity can be used to define the quantity of defocus. For example, in Fujiwara and Hatori, "Extraction of Sharp-Pointed Area from Plural Images", 1992 Autumn National Conference of Institute of Electronics, Information and Communication Engineers of Japan, D-625, pp. 6–267, the quantity of defocus is defined by defining the distance between an image created on the basis of its frequency and the current image in the image space.

B. Dynamic Range

When shot against light, the background is imaged bright but the object is dark; thus, the image quality radically changes with the shooting condition. Cameras now placed on the market are equipped with auto-gain and auto-iris functions and enable automatic shooting of images with optimum intensity and colors. The quality value in this case is considered on the basis of the shapes of histograms of the intensity and colors of the image, as reported in, for example, Fukushima, Hygo and Sekine, "Method of Correcting the Concentration Distribution of Images by a Non-linear Amplifier", 1992 Autumn National Conference of Institute of Electronics, Information and Communication Engineers of Japan, D-262, pp. 6–265. The image property can be detected from the shapes of histograms as reported in the above literature and this quantity can be used to define the image quality.

Besides, it is also effective to detect the presence or absence of a horizontal or vertical synchronizing signal SYNC. In the absence of the synchronizing signal SYNC from the video signal, the frame of captured visual images is out of order and is a defective frame which is meaningless as an image. Hence, such a defective frame can be removed from candidates for selection, by detecting the presence or absence of the synchronizing signal SYNC.

For those of such quality items which are desired to use, threshold values are predetermined for quantities which define them, and it is determined whether the image satisfies ("1") or not "0" for each quality item, depending upon whether the quantity of each quality item of the image exceeds the threshold value. A desired one or more of these quality items are selected; it is possible to decide whether the image quality is satisfactory or not, depending upon all decision results $Q_1, Q_2, \ldots, Q_i$ on such quality values $q_1, q_2, \ldots, q_i$ are "1s" (that is, the logical product of all decision results, $Q=Q_1Q_2\ldots Q_i$, goes "1"). Alternatively, it is possible to obtain the decision result Q=1 or 0 by making a similar decision, depending upon whether the sum, product or weighted mean of quantities of desired quality items, $q=q_1+q_2+\ldots+q_i$, $q=q_1Q_2\ldots q_i$, or $q=w_1q_1+w_2q_2\ldots w_iq_i$, is larger than a predetermined threshold value.

Also for event decision items other than the quality, the decision results for matching, image cutting point, hue histogram, the presence or absence of desired camera work and the presence or absence of the synchronizing signals are represented by M, C, H, W and Y, respectively, and their values are each made a "1" or "0" depending upon whether the respective decision result satisfies the image extraction condition or not. In the present invention, when the decision result Q thus obtained for the image quality and one or more decision results for a desired one or more of the other feature items (event conditions) are all "1s", it is decided that the image frame contains an event. That is, in the present invention, the event is always decided by the combination of a logical product and a logical sum of the decision result Q for the image quality and another event condition, as expressed by such logical expressions as EV =Q·W, EV= Q·Y·M, EV=Q·Y·H, EV=Q·C, EV=Q(W+C), EV=Q(M+H), . . . Thus, a high quality image can be obtained as a frame image which satisfies desired event conditions.

A standard threshold value is predetermined for each event condition and is held in an appropriate memory in the device together with the calculation method for each event condition. During initialization in step S1 a desired quality item and other event items (feature items) are selected, and for each of the selected event conditions, the event value EV is calculated in step S4 to determine whether EV=1 (that is, whether the event is present or not).

Moreover, it is also possible to determine feature items on the audio signal contained in the video signal and use them for event decision. For example, pieces of sequential sound data which are sequentially captured into the audio signal input part 19 are subjected to sound processing in the time and frequency domains through use of a sound processing algorithm and each feature thus obtained is matched with a predetermined event condition, by which an event can be detected. The features in the time domain are the signal power distribution and the like, for example, and the features in the frequency domain are the signal Fourier power and phase distribution, for example. The event conditions can be set, for instance, in the range of the threshold value of the signal power, the format shape of frequency, and features to be recognized depending on the presence or absence of sound (sound feature, word feature, speaker feature). This sound processing algorithm can be used as a substitute for the image processing algorithm PA in FIG. 2; but the combined use of them enables an optimum event decision with the event conditions (the logical product and sum, etc).

By the processing described above, it is determined whether the event is present or not (step S5), and if it is decided that no event is present, then the process returns to step S3 to capture the next frame, repeating the processing.

When it is decided in step S5 that the frame contains an event (EV=1), the captured images are laid out in a printing storage area in the layout storage part 16 in accordance with positions, image sizes and the like following the initialized layout rule LR (step S6). Referring now to FIGS. 5 through 8, the layout information in the printing storage area that is set at this time will be described in connection with examples of the layout shown in FIGS. 3 and 4.

Figure 3:
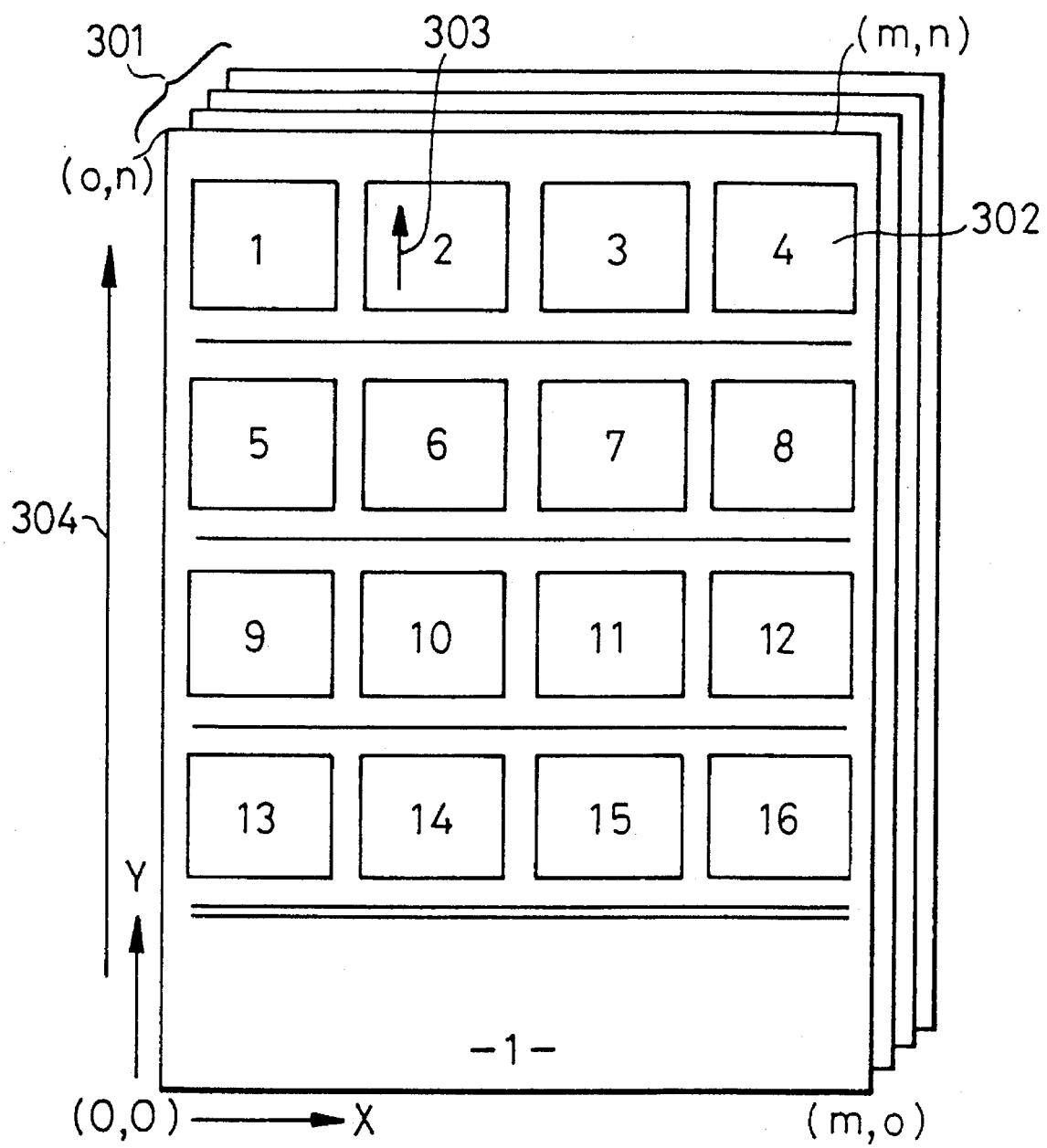
FIG. 3 is a diagram showing an example of the layout of output images.
Figure 5B:
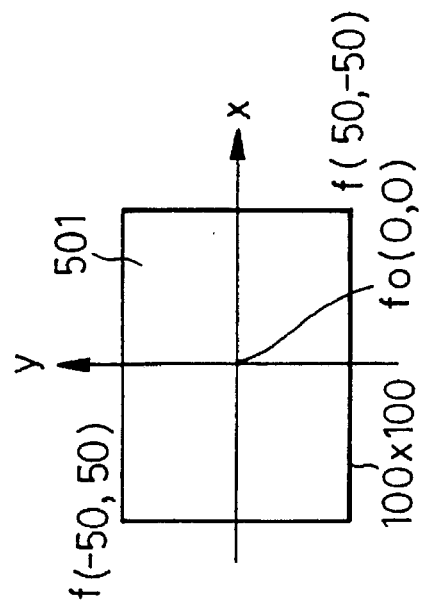
FIG. 5B is a diagram showing the coordinate system of each frame image.
Figure 5A:
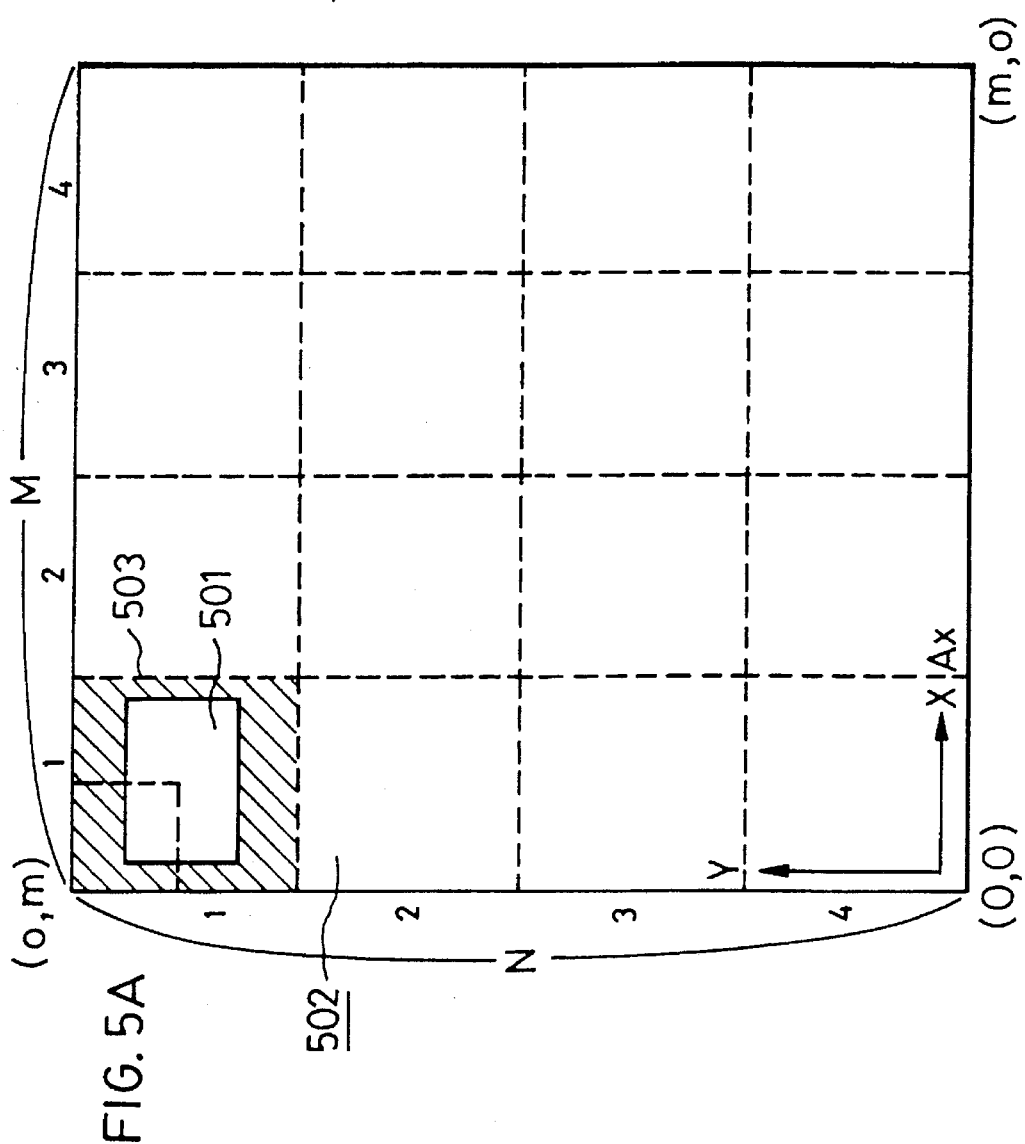
FIG. 5A is a diagram showing the image layout in an image storage area, corresponding to FIG. 3.

FIG. 3 shows an example in which image frames 302 of events k=1, . . . , 16 are printed in an array with 4 rows and 4 columns on each printing sheet 301. The arrow 303 indicates the upward direction and the rectangular printing paper 301 is positioned with its longer side up (indicated by the arrow 304). A printing image region which is defined by a coordinate range X=0, 1, . . . , n that is outputted from the printer 15 is expressed by Out(X, Y). The minimum unit of each of the X and Y coordinates is the pixel (or dot) of the printer 15. An m×n address region is prepared as a printing storage area in the layout storage part 16 in correspondence to the printing image area. For the sake of brevity, let an address (Ax, Ay) for a storage area 502 be represented by Ax=0, 1, . . . , m and Ay=0, 1, . . . , n as shown in FIG. 5A. Let a representative image frame to be extracted by a k-th event be represented by $f_k(x, y)$, where x=0, 1, 2, . . . , fm and y=0, 1, 1, . . . , fn.

For instance, FUJIX PICTROGRAPHY 3000, which is a commercially available high-definition image output device, has a 40 dpi (an index representing an image expression capability when outputting images and the number of dots (pixels) per inch) expression capability and is capable of outputting an image of 3800 pixels by 2759 lines on paper of the A4 size. The address of the printing storage area for the output paper is Ax=0, 1, 2, . . . , 3800 and Ay=0, 1, 2, . . . , 2759. The size of one frame image is 640 pixels by 480 lines when the video signal is of the NTSC system, and it can be expressed by $f_k(x, y)$, where x=0, 1, 2 , . . . , 640 and y=0, 1, 2, . . . , 480. As depicted in FIG. 5B, one frame image 501 is expressed by coordinate system x, y in the image. By initializing that the number of image frames to be output to one sheet of printing paper is a total of M by N, the size of the area 503 for the layout of one frame image can be determined, since the size of the printing storage area 502 is (Ax×Ay)=(m×n).

Let it be assumed that the number of images to be output to a sheet of printing paper is 10 rows by 10 columns, i.e. a total of 100, that the output device used is FUJIX PICTROGRAPHY and that the size of each image is 640 pixels by 480 lines in the case of the NTSC system. In this instance, the size of the area 503 which is assigned to one frame image in the printing storage area 502 is 380 by 275 addresses but the image has a 3 to 2 aspect ratio and, taking this aspect ratio into account, the size of the image 501 in the storage area 503 is about 380 pixels by 240 lines, reduced down to ½ the original image size.

Figure 6:
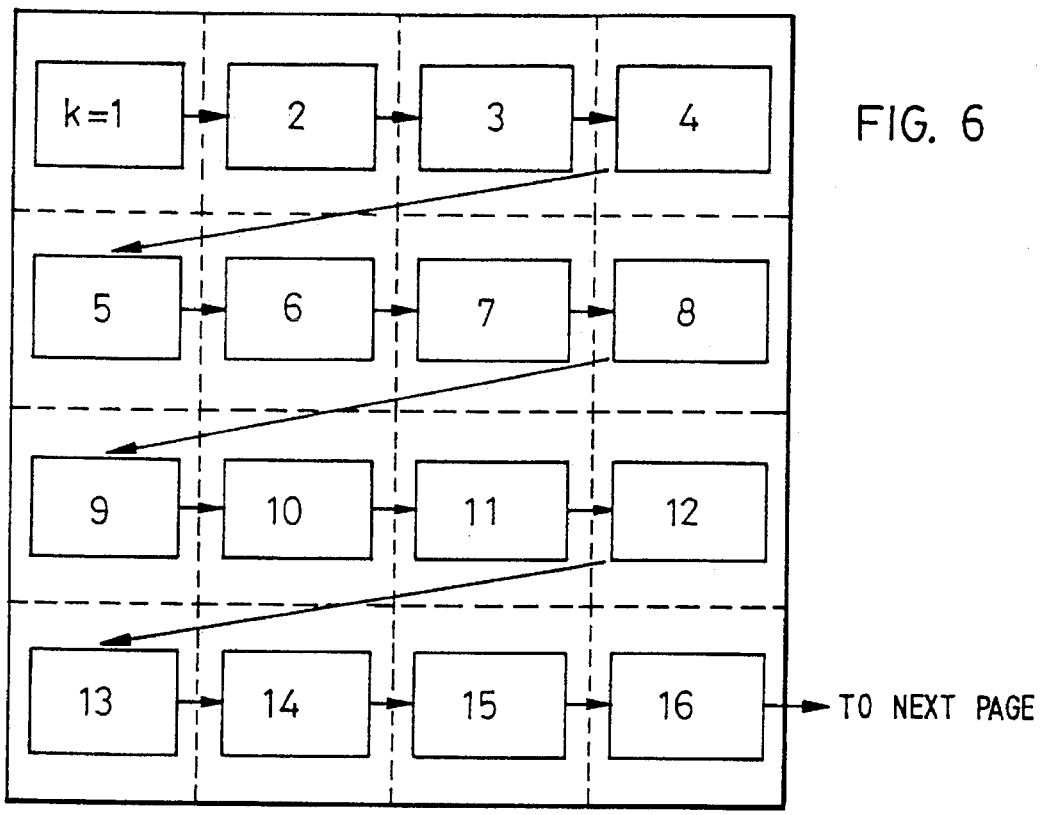
FIG. 6 is a diagram for explaining the image layout.

The order in which images are laid out in the printing storage area 502 in the order of detection of events is also initialized. FIG. 6 shows how it is set in the case of FIG. 3. By this, the image extracted by a k-th event is positioned in a k-th area in the printing storage area 502. The numeral in each image 302 in FIG. 3 corresponds to k.

Figure 4:
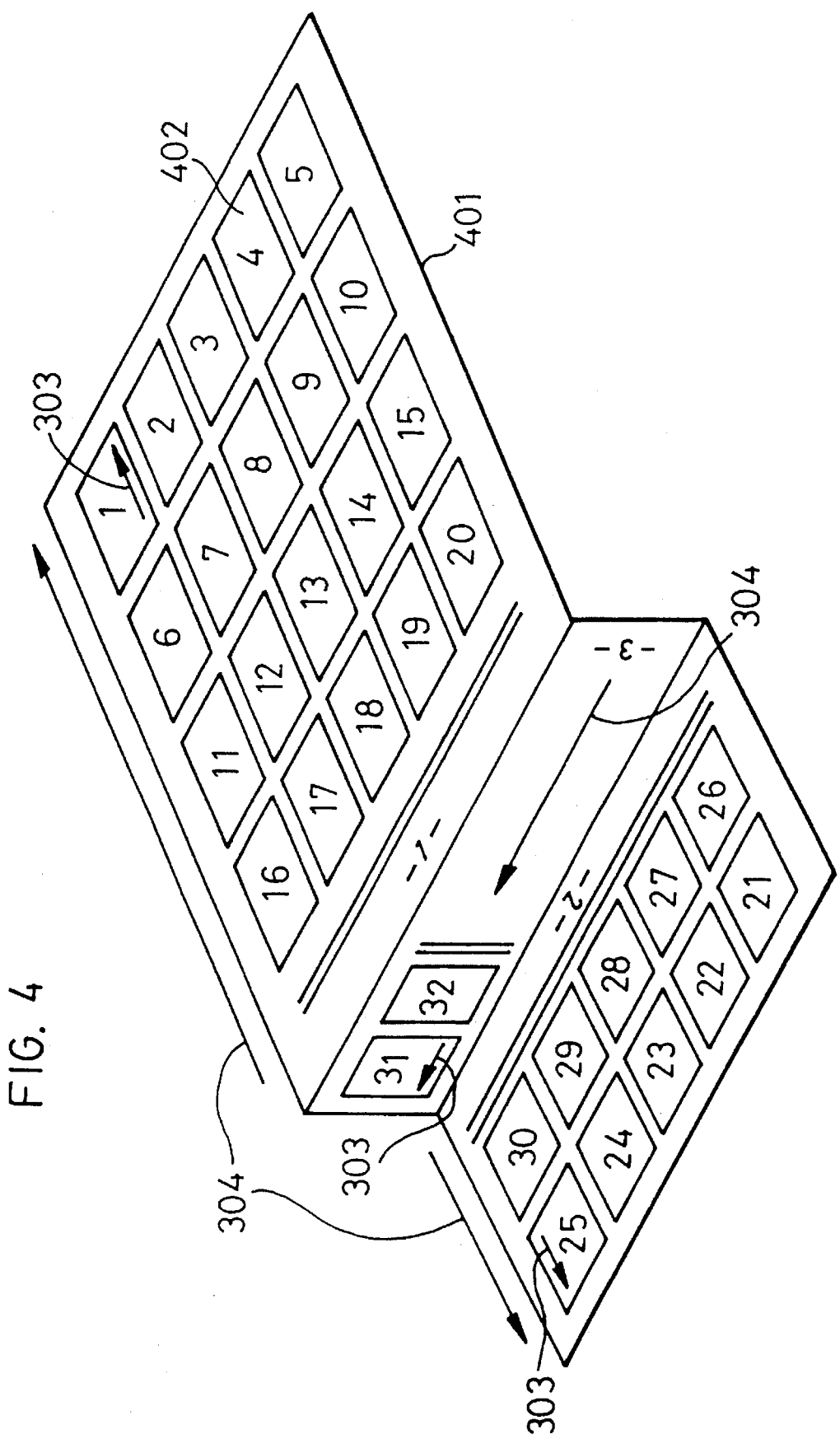
FIG. 4 is a diagram showing another example of the output image layout.
Figure 7:
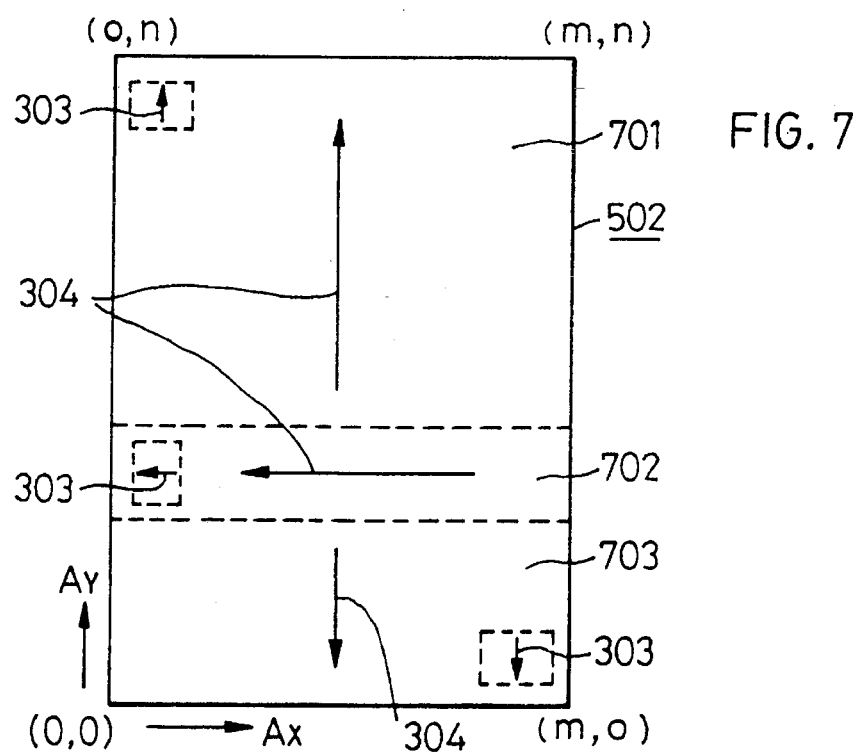
FIG. 7 is a diagram showing the image layout in the image storage area, corresponding to FIG. 4.

FIG. 4 shows the case of an image print 401 which is prepared as a label which is attached to, for example, a video tape case, for representing indexes of video images, each image 402 being identified by an event number k. When the number of images per print is initialized, the up-down relation for viewing the print is also set as indicated by the arrow 304 with respect to a plurality of array areas 701, 702 and 703. The vertical direction of each image is the same direction as the viewing direction, and hence is in agreement with the direction 303 in FIG. 4. In either case, the arrow is upward. In the example of FIG. 3 the viewing direction is one, but in the example of FIG. 4, as shown in FIG. 7, the printing storage area 502 is split into layout areas 701, 702 and 703 during initialization and their vertical direction and the vertical direction of the images are provided by arrows prior to a series of processing.

For the layout including rotation, second layout information is computed. The extracted images must be reduced, enlarged or rotated in accordance with the mode of print usage when they are laid out in the printing storage area 502. The size of the area 502 (corresponding to the output image size) is preknown by the above-mentioned setting and its enlargement/reduction rate (½ in the above-described example) can also be computed and the rotational angle is also preknown by initialization. Hence, the frame image $f_k(x, y)$ is subjected to the following geometrical conversion processing to create an image $f_{k'}(X, Y)$ of the same size and direction as in each area 503, which is laid out in the printing storage area 502. The aspect ratio A of the image is a constraint condition which is used to transform the same condition as that of the input image.

$$f_k'(X, Y) = A[f_k(x, y)]$$

$$A: \begin{pmatrix} X \\ Y \end{pmatrix} = \begin{pmatrix} a & b \\ c & d \end{pmatrix} \begin{pmatrix} x \\ y \end{pmatrix} + \begin{pmatrix} e \\ f \end{pmatrix}$$

where $f_{k'}(x, y)$ indicates a transformed image which is located in the printing storage area 502 and a, b, c, d, e and f are transformation coefficients. These transformation coefficients are second information for location in the printing storage area 502. This conversion equation is commonly referred to as an affine transformation, which is used for enlargement/reduction, rotation and parallel shift.

Figure 8:
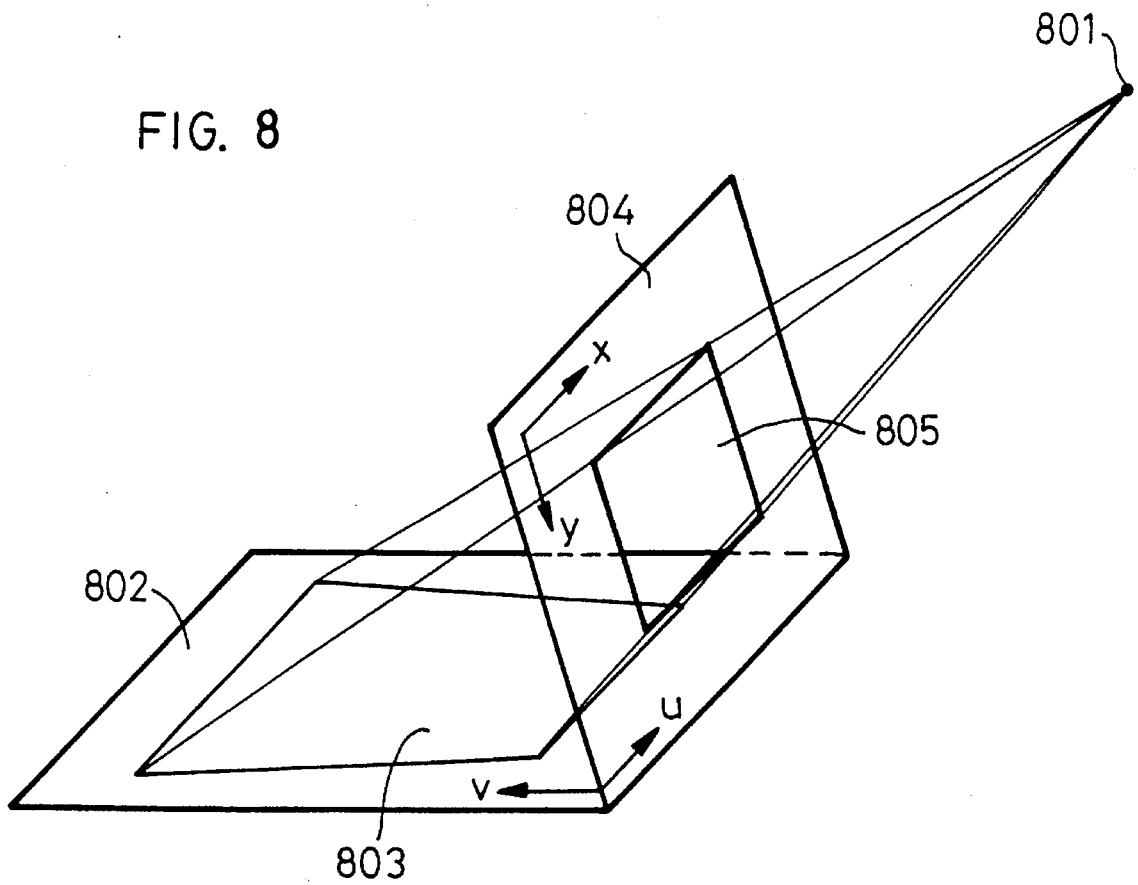
FIG. 8 is a diagram for explaining the correction of an image according to the viewing point.

By initializing the point of viewing the print, it is possible to provide the print in accordance with the viewing point by carrying out image processing to correct an image distortion which is caused when viewing the print aslant, for instance. This is shown in FIG. 8. Reference numeral 801 denotes the viewing point. When viewing a corrected image 803 on a printing paper 802, the above-mentioned area 803 (701, 702, 703) can be observed as if it is a distortion-free image 805 on an imaginary printing paper 804. In order that the image is observed as an image of the same aspect ratio as that of the input image, the following transformation is carried out.

$$f_k''(u, v) = B[f_k'(X, Y)]$$

$$B: \begin{pmatrix} u \\ v \end{pmatrix} = \begin{pmatrix} \frac{a1X + a2Y + a3}{a7X + a8Y + 1} \\ \frac{a4X + a5Y + a6}{a7X + a8Y + 1} \end{pmatrix}$$

where f"(u, v) indicates a transformed image concerning the viewing point that is located in the printing storage area 502, and a1, a2, a3, a4, a5, a6, a7 and a8 are coefficients. The coefficients are third information for the location in the printing memory. This transformation is commonly used as a projection transformation. In this case, as the layout rule LR, a template description is prepared for fixed portions as conditions for the location site and image size, and by adding information of parts which change upon the occurrence of an event, actual image and additional information are laid out. By this, the layout form can easily be changed or modified only by changing the template.

FIG. 11 an example in which the image layout in the printing storage area 502 is actually printed on paper. In this example, representative images 41 each judged as containing an event are arranged on the paper 33 from left to right and from top to bottom in the order of time, that is, in the order of occurrence of events. Where a camera work parameter is provided, as a condition for location in the printing storage area, to the calculation control part 14, the following location takes place. A description will be given first of the location in the case of camera work without its position shift (panning, tilting, zooming). When the event is a particular camera work, a sequence of successive frames are captured during the camera work. These successive frames are located in the printing storage area 502 after the input images are subjected to a similar transformation by use of detected camera work parameters so that the size and position of the object are the same between the respective frames. In this transformation and location, the camera work will be canceled. As a result, a panoramic image obtained by the sequence of frames is formed in the printing storage area 502. Next, a description will be given of camera work with its motion (zooming, tracking, dollying). This camera work parameter contains three-dimensional information of an object disposed in the shooting space. This camera work parameter can be used to locate a plurality of stereoscopic frames in the printing storage area 502, taking parallax into consideration. In FIG. 11, reference numeral 42 denotes displays of additional information; information which is obtained when finding an event in the course of image processing, such as a time code or similar time display of positional information of the current frame, the time width to the next representative image or change amount of the image, is represented in text or graphic form and disposed near the representative image (step S7). In this case, the additional information is expressed by numerals or bar codes. Incidentally, the additional information may also be recorded in the magnetic coating 33M provided in a variable part of the output paper 33. Next, a check is made to see if processing of the page concerned is completed (step S8), and if not, the process goes back to the capture of the next frame (step S3), repeating the processing.

When it is determined in step S8 that the processing of the page concerned is completed, the calculation control part 14 transfers the located image from the layout storage part 16 to the printer part 15 for printing to the output paper 33 (step S9). In this instance, it is also effective to provide a plurality of buffer memories in the layout storage part 16 or printer 15 so as to enable the transfer of the print of the next page, though the print processing would consume more time. Then, a check is made to see if the entire processing is completed (step S10); if the tape is replayed to its end or a predetermined position, the processing is terminated. If not, the process returns to step S3 to repeat the processing again. In the case of recording video images and sound for a certain period of time after the detection of an event, a video/sound recording process is started at the time of detection of the event (step S11), after which for a certain period of time the audio signal and the video signal are captured by sampling. The audio signal is stored in the storage part and the video signal is recorded in the layout storage part 16 or a separately provided storage part. After the certain elapsed time they are recorded, together with the additional information, in the magnetic coating 33M on the output paper 33 by the magnetic recording part 21, or on a package media by the package media recording part 22 (step S12). The package media herein mentioned is a reloadable or detachable media such as the IC card shown in FIG. 1, a floppy disc, a removable hard disc or optomagnetic disc. In the above, recording in the magnetic coating 33M on the output paper 33 must be performed in association with the printing process, but recording on the package media can be carried out independently in parallel to the printing process.

Figure 9:
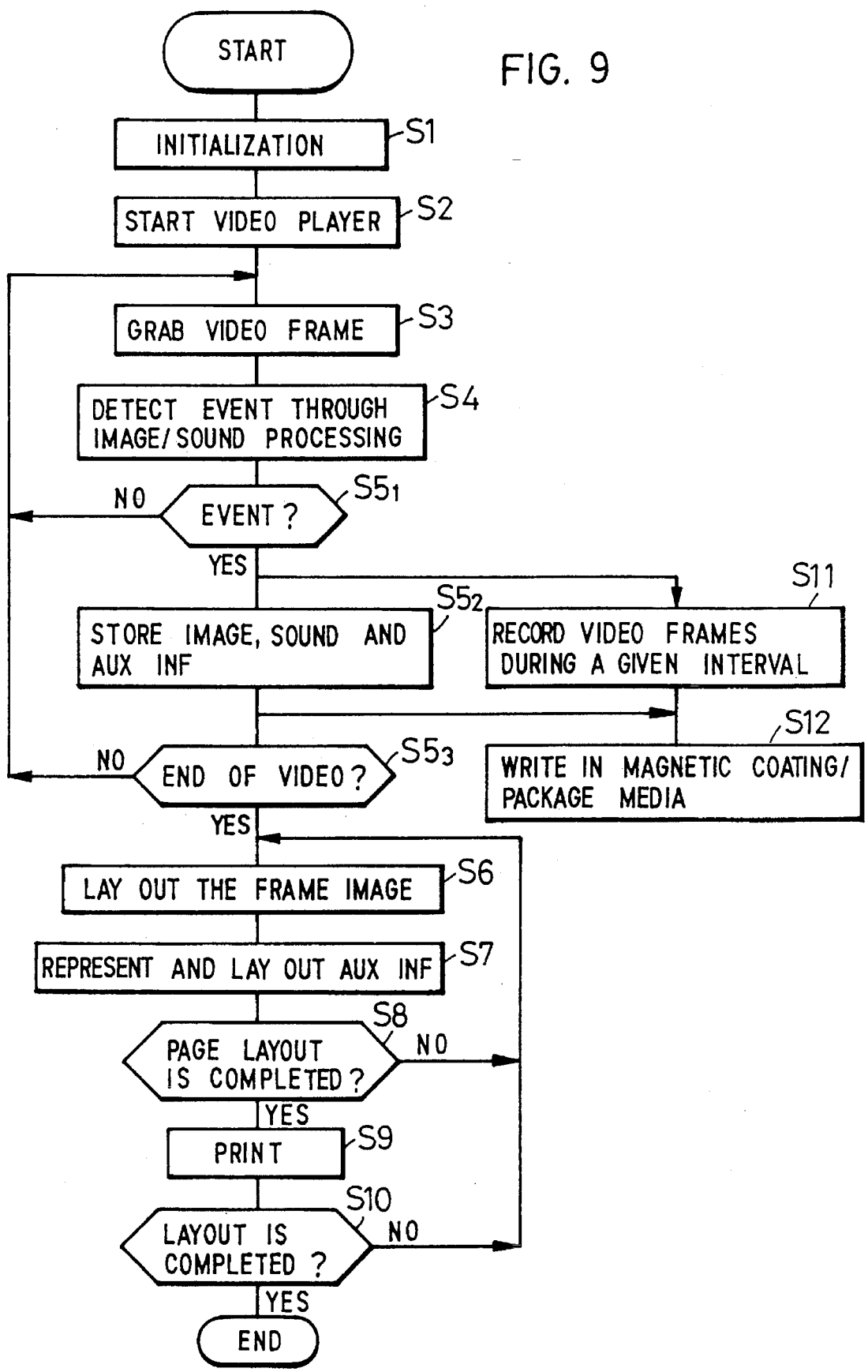
FIG. 9 is a flowchart showing another example of the process by the image detecting system A in FIG. 1.

Next, a description will be given of another example of the video image printing process. The system configuration used in this example is the same as that shown in FIG. 1 but the processing by the calculation control part 14 differs from that in the above-described example. The processing is shown in FIG. 9.

In the above-mentioned example of the video image printing process, when it is decided in step S5 that an event is present, the image is located in the layout storage part 16; in this example, however, when it is decided in step $S5_1$ that an event is present, the captured image is stored in the storage part 20 together with sound and additional information (step $S_2$). By this, it is possible to choose a high quality or optimum representative image and change the number of images or their sizes to optimum values. The additional information contains the time code of the image decided as an event, the time from the preceding event to the current event, the matching value and quality value. After the storage of the captured image, the event detection is repeatedly performed until completion of the video replay. It is also possible to initialize updating with the event image stored as the reference image. Next, it is determined whether the video replay is completed (step $S5_3$). When it is decided that the video replay is completed, the process from step S6 to step S10, that is processing for the location of the image stored in the layout storage part 15 and the additional is carried out as in the above-described example. In this example, however, when it is found that the location is not completed (step S10), the process returns to step S6, repeating the above-noted location process. The process flow from step S1 to step S4 which it triggered by the start of the printing process is the same as in the above-described example. Incidentally, since image storage is time-consuming and requires an enormous memory capacity, it is preferable to store the image through utilization of well-known data compression techniques.

In the above, representative images are selected from the stored images in the storage part 20 in decreasing order of the matching value and the quality value of the replayed video signal in accordance with the number of images preset by the calculation control part 14. The calculation control part 14 locates the thus selected images in the storage area of the layout storage part 16. In this case, the calculation control part 14 is allowed to correct an image of a small quality value to increase its quality value so as to further enhance the quality of the image to be printed. In concrete terms, one or more of intensity conversion, color conversion, emphasized field interpolation and intra-frame pixel interpolation are carried out. The sizes and number of representative images that are printed can be modified by computing, in the calculation control part 14, the size and number of an optimum image layout on the basis of predetermined size of the print and number of images to be arranged. Supplied with this information, the user can change the sizes and number of representative images by carrying out the initialization again accordingly. It is also possible that the calculation control part 14 selects images in the storage part 20 in decreasing order of the matching value and the quality value in accordance with the above-mentioned computed optimum number of representative image and converts the size of the selected image by the aforementioned geometric transformation, thereby automatically changing the size and number of representative images.

Turning now to FIG. 10, the image access system B in FIG. 1 will be described.

In the image access system B, when an input event occurs in the state of waiting for the input of user's instruction (step S50), the contents of the input event are analyzed (step S51). When the instruction is to scanner readout, the scanner 52 is used to read out additional information printed on the output paper 33 (step S52). For example, when the additional information is represented by bar codes, the scanner 52 functions as a bar code reader. Alternatively, the entire paper can be scanned by using facsimile as the scanner. When the instruction is magnetic readout, the magnetic coating 33M on the output paper 33 is read out by the magnetic readout part 57 (step S53); when the instruction is package readout, the additional information is read out by the package media readout part 55 (step S54); and in the case of key input from the user input part 54, the input instruction information is read out (step S55). Then, the information thus obtained by such readout means is converted into code form for handling in the subsequent calculation processing (step S56). For example, input information from the bar code reader is converted to alphanumeric codes, and the instruction input through push-buttons is converted to numeric characters or similar codes as identifiers corresponding to the input buttons. Next, the code contents are analyzed (step S57) and the contents of the analyzed results are displayed on the information display part 53 (step S58). When the read-out information is input information from facsimile, the area which is used for the recognition of document information is divided and the additional information cut out and character recognition can be done. Next, the subsequent processing differs with the code contents. In the case of a video access/replay command, it is sent via the video control part 50 to the video player 58 (step S59). As the result of this, the video tape is accessed following the readout information and upon completion of the access, a replay control command is sent to the video player 58 (step S60). The video access command contains video frame information and time information as well. To the video player 58, a video access command for writing event occurrence information into a specified area of the video medium is sent together with time information for replay. The video player 58 can write the event occurrence information into a part of a sound track, closed-caption area or frame image area, for example. In the case of a command for video/sound replay for a short time from the time of event detection, coded video/audio signals are decoded (step S61) and the results are displayed/replayed in the video display/audio replay part 56 (step S62). As for the processing corresponding to other key input, such as key input from the user input part, necessary processing is carried out (step S63). By retouching the printed display information with a pen and reading it out by a scanner as of facsimile, unnecessary information can be skipped. This can be achieved also by sending the display contents between remote facsimiles over a communication channel. Upon completion of the above processing, the system enters again the state of waiting for an input event.

Figure 12A:
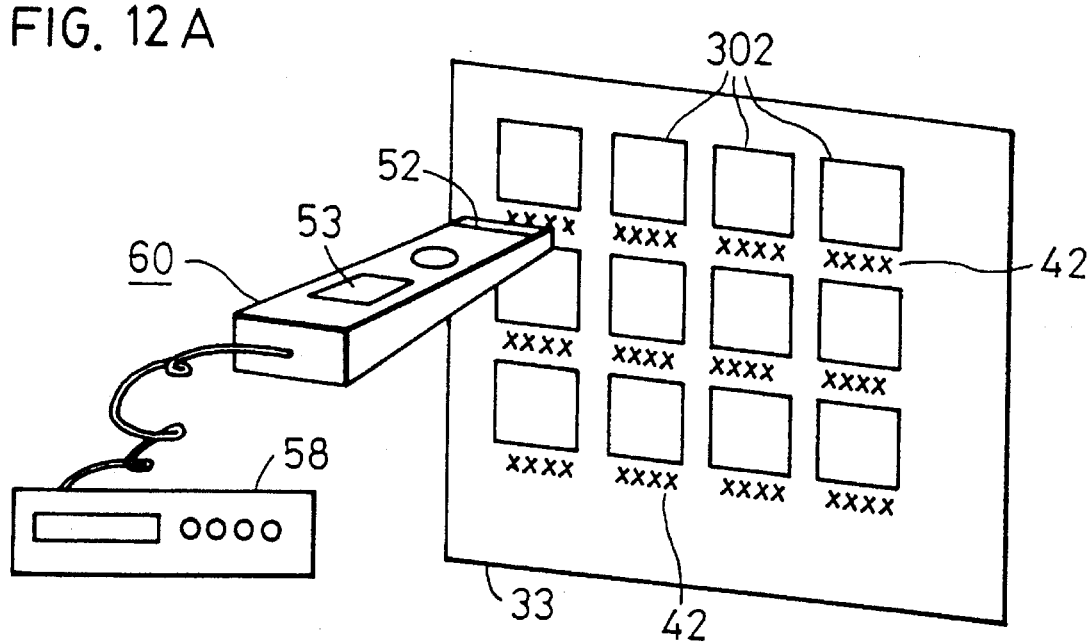
FIG. 12A is a perspective view illustrating an example of the external appearance of the system in one mode of use.
Figure 12B:
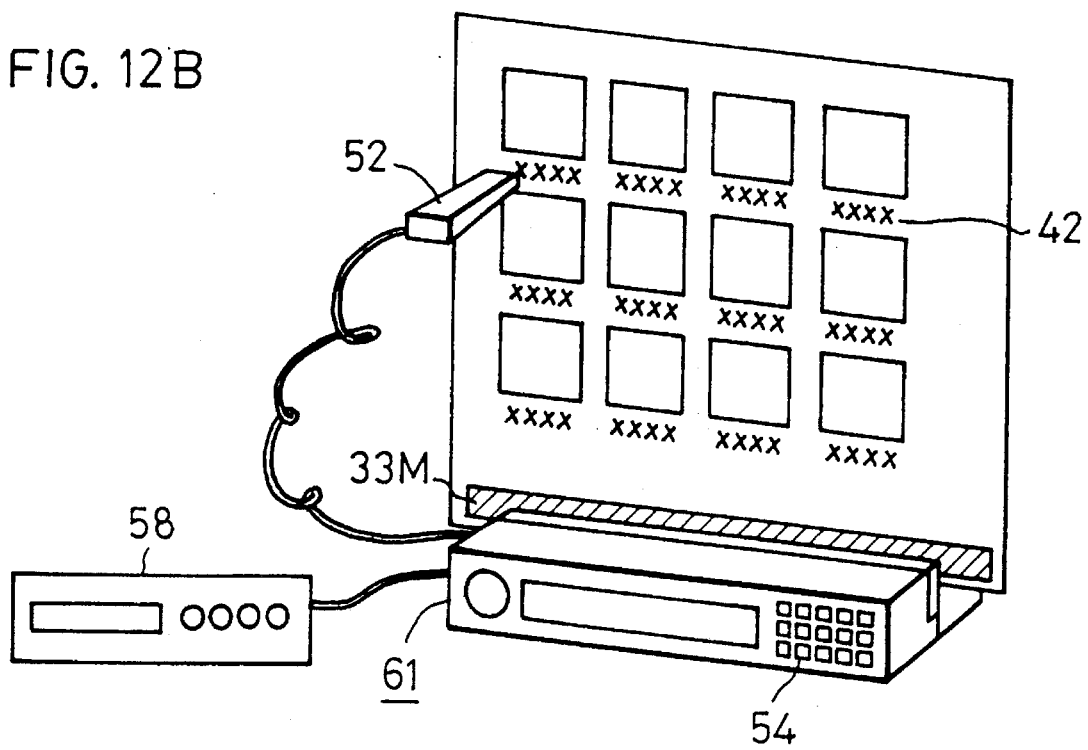
FIG. 12B is a perspective view illustrating another example of the external appearance of the system in that mode of use.
Figure 13A:
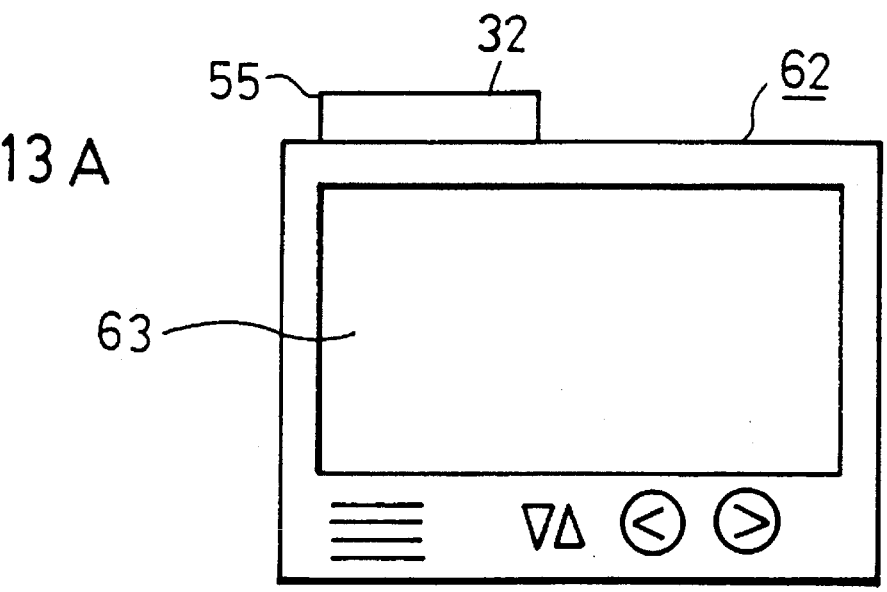
FIG. 13A is a perspective view illustrating an example of the external appearance of the system in another mode of use.
Figure 13B:
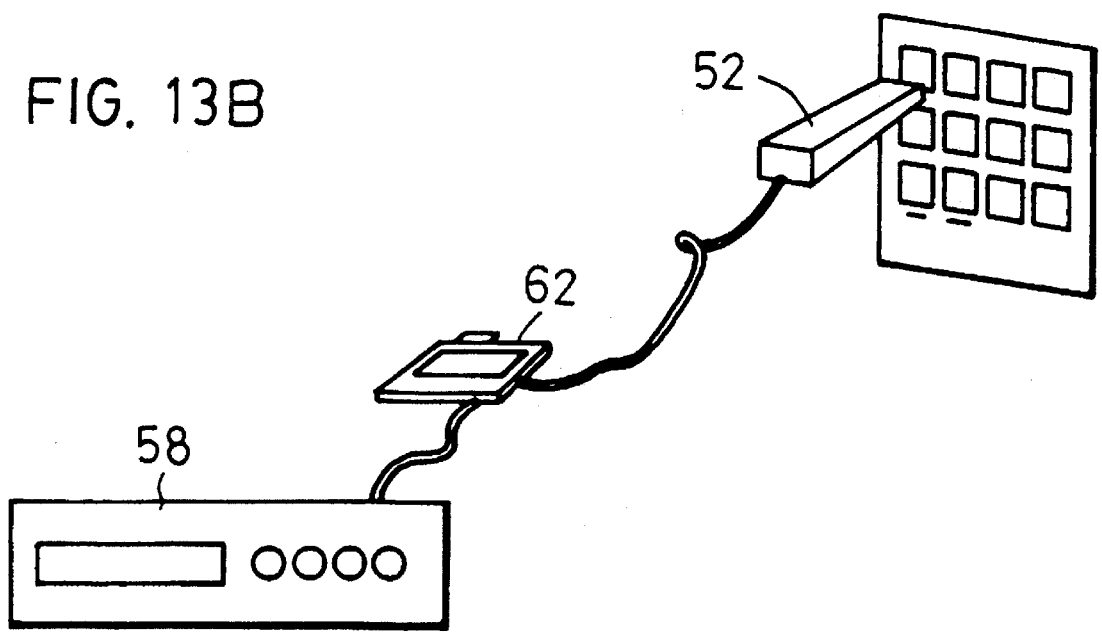
FIG. 13B is a perspective view illustrating another example of the external appearance of the system in said another mode of use.

FIGS. 12A, 12B and 13A, 13B each show the external appearance of a concrete device. FIG. 12A shows the external appearance of a scanner integrated type video interface 60 having only the scanner 52 as additional information readout means, the output paper 33 having printed thereon the additional information 42 and the image trains 302 indicating video image indexes and the video player 58. FIG. 12B shows the magnetic readout type video interface 61 having the user input part 54 and having connected thereto the scanner 52. In this example, the additional information for an access to the video tape, printed on the output paper 33, is read out by the scanner 52 and the additional information on the audio signal recorded in the magnetic coating 33M on the output paper 33 is read out by the magnetic readout type scanner 52. FIG. 13A shows a compact display type video interface 62 having the package media readout part 55, and even with this device alone, it is possible to get the summary of the image by temporally series replay of a short moving image and sound. In this example, the IC card 32 is read out as the package media. Reference numeral 63 denotes a liquid crystal video display part for displaying an image or the like contained in the additional information read out by the readout part 55 from the IC card 32. In FIG. 13B, the scanner 52 and the video player 58 are connected to the device of the type shown in FIG. 13A.

With the entire system of the FIG. 1 embodiment, it is possible to automatically perform image processing of video signals, extract high quality images which satisfy a particular event condition and print them in an optimum layout; the most important feature of this system lies in that a display based on additional information output from the video image detecting system A or associated video images can be automatically accessed and replayed. In the above embodiment, the additional information is printed on paper for readout by the scanner, printed on paper and recorded magnetically for optical and magnetic readout, printed on paper and recorded on the package media for readout by scanner and package media readout. However, the system can freely be constructed for only magnetic recording/magnetic readout, package media recording/readout, or a combination of the both methods; it is also possible that these means are all provided and used in combination or selectively. In the case of only one input/output system, the additional information for video access and additional information about sound and image are handled as one piece, but in the case of using two or more input/output systems, they can be handled separately. At any rate, the present invention differs largely from the prior art in: that high quality video image indexes can automatically be produced; that no particular hardware is needed for viewing them, that is, only printing paper is needed; that no particular operation is needed therefore; and that video can automatically be accessed by additional information that is output from the print side by adding a system for the user.

As described above, the video image print access method and system of the present invention permits automatic detection of high quality images from video images upon each occurrence of an event. By printing the read-out images in a desired layout on paper, no computer screen or video monitor is needed for viewing the video indexes; hence, it is possible to offer video indexes that are easily portable and capable of displaying high quality images. Moreover, additional information of images printed on paper can be used to access and replay the associated video images.

According to the present invention, when sound and images are output together with the additional information for a certain period of time following the detection of an event, the video contents can be detected by only the information containing a moving picture and sound; hence the contents of video images can be known with more ease. In the case of using camera work to detect an event and changing the sizes and positions of image being laid out in accordance with camera work, it is possible to get an appropriate gist of the video images following camera work. In the case of using sound processing to detect an event, the selection of representative images is easier than in the case of using image processing alone. By making possible the enlargement/reduction, rotation and position shift of images through geometrical transformation, the image can be located with ease. In the case where a template description is prepared concerning the conditions of arrangement of images and additional information and is added with a changing portion upon each occurrence of an event, the layout form can easily be changed by changing the template description.

By using facsimile for readout of additional information, it is possible to produce an effect that a video access can be achieved between remote places.

In the case where event occurrence information is written into a video medium, the information can be used for subsequent access to the video medium. In the case where images, sound and additional information are stored upon each occurrence of an event and the images are arranged after completion of the video replay, it is possible to select optimum representative images. By using the value of matching with a reference image and the quality value to detect an event, representative images can be detected properly, providing increased ease in getting the summary of video images. In the case where images at the time of detecting an event are stored in compressed form, the storage time can be reduced and the number of images stored can be increased. By selecting representative images of large quality value and increasing the quality value of the selected representative images, a high quality print output can be obtained.

Furthermore, in the case of computing optimum sizes and number of arranged images on the basis of a predetermined print size and a predetermine number of arranged images, an optimum output can automatically be obtained; hence, the contents of video images can be learned with more ease.

It will be apparent that many modifications and variations may be effected without departing from the scope of the novel concepts of the present invention.

What is claimed is:

1. A video image search system comprising:

video signal source means for outputting a video signal in a sequence of frame images;

layout storage means for storing images and additional information in a layout;

calculation control means which repeats processing in which each of said frame images of said video signal is subjected to image processing to obtain, as event items, a quality value of each of said frame images and at least one feature value characterizing contents of said video signal, and when both said quality value and said feature value satisfy predetermined conditions, it is decided that an event is present, said frame image decided to have an event is stored in a predetermined desired layout in a predetermined area in said layout storage means, and at least one part of additional information corresponding to said frame image, obtained at the time of said image processing is arranged in said area of said layout storage means, together with said frame image, in accordance with a predetermined array condition, and which reads out said arranged frame image and additional information; and event output means for outputting, as an event, at least one of said stored frame images and said additional information both of which are read out from said layout storage means.

2. The system of claim 1, wherein said video signal source includes video replay means which replays and outputs recorded video signals.

3. The system of claim 1, wherein said video signal source is a signal stream through which said video signal supplied from the outside is fed to said system.

4. The system of claim 1, wherein said event output means includes printer means which stored frame image and at least one part of said additional information on a sheet.

5. The system of claim 1, further comprising a video access device which includes: video replay monitor means controllable from the outside; readout means for reading out said additional information being output; and a main control part which converts said additional information read out by said readout means into video replay control information and controls said video replay monitor means by said converted information to access a video image corresponding to said additional information.

6. The system of claim 5, wherein said event output means includes printer means for stored frame image and at least one part of said additional information on a sheet and said readout means includes scanner means for optically reading out said at least one part of said additional information.

7. The system of claim 5, wherein said event output means includes magnetic recording means for magnetically writing at least one part of said additional information on a magnetic medium formed at a predetermined position on said sheet and said readout means includes means for reading out said at least one part of said additional information from said magnetic medium on said sheet.

8. The system of claim 5, wherein said event output means includes package media recording means for recording said additional information on package media, readout means includes package media readout means for reading out said additional information recorded on said package media and said main control part controls aid package media readout means to read out said additional information.

9. The system of claim 1 or 5, wherein said video signal contains a video signal and an audio signal, which further comprises sampling means for sampling said video signal from said video signal source means and for outputting sample data and data storage means for storing said sample data, and wherein when said video signal is decided to have an event, said calculation control means controls said data storage means to store therein at least said sample data of said audio signal in said video signal as part of said additional information for a fixed period of time upon said decision.

10. The system of claim 5, wherein said readout means is facsimile means and said main control part controls said video replay monitor provided at a remote place via communication.

11. The system of claim 1 or 5, further comprising storage means for storing image and additional information and wherein when either one or both of the result of image processing or sound processing of said video signal satisfy, as said feature values, a particular condition, said calculation control means decides that an event condition for said feature value is satisfied, stores in said storage means said image decided to have an event, or said image and sound and said additional information corresponding thereto, and arranges said stored image and additional information in said storage area of said layout storage means in accordance with predetermined size and position conditions upon each occurrence of an event or after termination of said video signal.

12. The system of claim 11, which further comprises means whereby, when said calculation control means decides the occurrence of an event and stores an image or said image, sound and additional information in said storage area, data of at least said image is stored in compressed form.

13. A video image search method comprising the steps of:
(a) subjecting an input video signal to image processing for each of a plurality of frame images to obtain, as event items, a quality value of each frame image and at least one feature value characterizing contents of said video signal;
(b) deciding that an event is present when said quality value and said feature value both satisfy particular conditions;
(c) storing a frame image decided to have an event, in a predetermined desired layout in a predetermined storage area in layout storage means and arranging additional information corresponding to said image, obtained in said image processing, in said storage area of said layout storage means in accordance with a predetermined position condition and in correspondence to said image;
(d) repeating steps (a), (b) and (c) and, upon completion of arrangement into said storage area, reading out said arranged image and additional information from said storage area; and
(e) outputting, as an event, at least one of said stored images and said additional information from said storage area.

14. The method of claim 13, further comprising a step of reading out, by readout means said at least one part of additional information read out from said storage area and output as said event, converting said additional information to a control signal and controlling video replay monitor means by said control signal to access an image corresponding to said additional information.

15. The method of claim 14, wherein said event outputting step includes a step of printing said image and said at least one part of additional information read out of said storage means on a sheet and said reading-out step includes a step of optically reading out said additional information printed on said sheet.

16. The method of claim 15, further comprising a step of reading out said printed additional information by facsimile and controlling said video replay monitor means provided at a remote place by communication.

17. The method of claim 15, further comprising a step of computing and presenting the size and the number of optimum arranged images on the basis of predetermined size of a print and the number of images to be arranged, when said images and additional information in said storage area.

18. The method of claim 17, further comprising at step of selecting images stored in decreasing order of the matching value and the quality value in accordance with said computed optimum number of images when arranging said frame images and additional information and arranging said selected images after transforming their sizes by geometric transforming means in accordance with said computed optimum image layout.

19. The method of claim 14, further comprising a step of writing an index showing the position of occurrence of an event in accordance with said read-out information, in a video medium, by controlling said video replay monitor means.

20. The method of claim 13 or 14, wherein said step (c) comprises a step of storing said image in storage means in a data compressed form, and a step of reading out said image from said storage means and arranging it in said storage area of said layout storage means upon occurrence of an event or after termination of said video signal.

21. The method of claim 13, further comprising a step of printing said image read out of said storage area on a sheet, magnetically recording said at least one part of additional information on a magnetic medium formed on said sheet, reading out said recorded additional information, converting said read-out information to information for controlling video replay monitor means and controlling said video replay monitor means by said converted information to access an image corresponding to said additional information.

22. The method of claim 13, further comprising a step of printing said image read out of said storage area on a sheet, recording at least one part of said additional information on package media, reading out said additional information recorded on said package media, converting said read-out information to information for controlling video replay monitor means and controlling said video replay monitor means by said converted information to access an image corresponding to said additional information.

23. The method of claim 13, further comprising a step of subjecting said image to geometrical transformation to satisfy a predetermined particular arrangement condition when said image is arranged in said storage area.

24. The method of claim 13, further comprising a step of sampling and recording only an audio signal in said video signal or both of an image signal and said audio signal for a fixed time upon deciding that said video signal has an event, said recorded information being used as one part of said additional information.

25. The method of claim 13, wherein said feature value as said event item is a predetermined particular camera work and which comprises a step of detecting said camera work and changing the size and position of an image to be arranged in said storage area, in accordance with said detected camera work.

26. The method of claim 13, wherein said feature value as said event item is sound information, said video signal is subjected to image processing and sound processing and when the results of said image processing and sound processing satisfy a particular condition, it is decided that an event condition is satisfied.

27. The method of claim 13, wherein a template description corresponding to a fixed condition is prepared as a predetermined condition for arranging a frame image and additional information when detecting an event and a changing part is added to said description upon each occurrence of an event, thereby arranging said frame image and said additional information.

28. The method of claim 13, wherein the result of image processing or sound processing of said video signal is used as an event item, and when one or both of them satisfy a particular condition, it is judged that the event condition of that item is satisfied, an image decided to have an event or said image and sound and additional information obtained during said processing are stored, and upon each occurrence of an event, or after termination of said video signal, said stored image and additional information are arranged in said storage area in accordance with predetermined size and positional condition.

29. The method of claim 13, further comprising a step of computing, as said feature value for the decision of an event, a matching value between a reference image and the image of said video signal and deciding that the event condition of said feature value is satisfied when said matching value matches a predetermined condition.

30. The method of claim 29, wherein when it is decided that said event is present, said reference image is updated with the image decided to have said event.

31. The method of claim 29, wherein said event condition deciding step if a step of computing, as said matching value, the distance between said reference image and the image of said video signal in a feature space and deciding that the event condition is satisfied when said distance is larger than a predetermined threshold value.

32. The method of claim 29, wherein said event deciding step is a step of computing the number of pixels larger or smaller than a threshold value provided by the quantity of blur of an image or its intensity signal, or the presence or absence of a synchronizing signal of a replayed video signal as said quality value, and a camera work parameter as said feature value and deciding that an event is present when these computed results match a predetermined condition.

33. The method of claim 29, further comprising a step of selecting images decided to have an event in decreasing order of said matching value and the quality value of the video signal in accordance with predetermined number of images and arranging them in said storage area.

34. The method of claim 29, further comprising a step of correcting an image of a small quality value to improve its quality when arranging image decided to have an event and additional information in said storage area.

35. The method of claim 34, wherein said image correcting means includes means for performing intensity conversion, color conversion, emphasized field interpolation and intraframe pixel interpolation of images in the step of correcting images of small quality value when arranging said images and additional information in said storage means.

* * * * *